United States Patent [19]

Wisotzky

[11] 3,764,753

[45] Oct. 9, 1973

[54] TONE KEYING CIRCUIT FOR TELEPHONE INBAND SIGNALING SYSTEM

[75] Inventor: Otto G. Wisotzky, San Francisco, Calif.

[73] Assignee: GTE Automatic Electric Laboratories, Incorporated, Northlake, Ill.

[22] Filed: Jan. 31, 1972

[21] Appl. No.: 222,187

[52] U.S. Cl. ........................... 179/84 VF, 179/17 A
[51] Int. Cl. ........................................... H04m 1/00
[58] Field of Search ...................... 179/84 VF, 17 A

[56] References Cited

UNITED STATES PATENTS 3,676,602 7/1972 Zaky et al. ...................... 179/84 VF
3,688,050 8/1972 Zaky et al. ...................... 179/84 VF

*Primary Examiner*—Ralph D. Blakeslee
*Attorney*—K. Mullerheim et al.

[57] ABSTRACT

A keying circuit is described that enhances the output level of an oscillatory tone signal source and controls the gating of a tone burst from said source to a telephone transmission line in response to signaling control means. The circuit provides a shunting circuit across the oscillator output which includes switching means to enable or disable the shunting circuit and timing means connected between the switching means and the signaling control means. The timing means disables the switching means for a predetermined time interval that is greater than the dial pulse interval.

18 Claims, 3 Drawing Figures

TONE KEYING CIRCUIT FOR TELEPHONE INBAND SIGNALING SYSTEM

BACKGROUND OF THE INVENTION

1. Field of the Invention

This invention relates to signaling systems and more particularly to systems in which signaling is effected by the transmission of bursts of alternating current.

2. Description of the Prior Art

Oscillatory burst signaling systems such as the voice frequency signaling arrangements in telephone systems, for example, typically provide means for selectively keying or gating an oscillatory tone signal source to a transmission line in response to an input of direct current control signals. In addition to responding to the control signals, which turn the oscillatory bursts on and off, the keying circuit must operate to enhance the signal level when signaling information is to be transmitted. Further, the enhancement of the signal level must be retained for a period of time which is in excess of that required for dial pulse transmission or of a dial pulse interval. One way in which tone keying has been used in the prior art is illustrated in U.S. Pat. No. 3,484,558 issued Dec. 16, 1969, in which the unit controls the high and low tone levels of the oscillator by use of a split secondary transformer. Tone from an external source is fed to the primary of this transformer. The tone level is controlled by switching transistor Q2 in FIG. 1 of the reference and diodes CR5 and CR6. The tone bursts are controlled through a switching transistor Q1 of the subject reference and diodes CR3 and CR4 which, when forward biased, shunt out the tone thereby reducing the level to a manageable amount. A shift in the turns ratio lowers the output tone level by approximately 12 dB which is the change in level desired for present-day inband signaling systems. In the tone-off condition, that is when the oscillatory burst is shunted by diodes CR3 and CR4, the shorting path is such that all other diodes in the tone transmission path are back biased resulting in a reduction of approximately 80 dB in the level of tone that is coupled to the transmission line. The output of the tone enhancing and keying circuitry is applied to a push-pull amplifier consisting of transistors Q3 and Q4 and thence to an output transformer for coupling to the transmission line. The tone keying arrangement illustrated in the subject reference is relatively complex and therefore costly since it uses a considerable number of parts. Further, the use of the push-pull amplifier in the output circuitry can affect the transmission balance and hence the introduction of transients or other unwanted signals into the transmission line.

Another example of telephone inband signaling systems which provide keying of the tone burst signal is illustrated in U.S. Pat. No. 3,563,439 issued Feb. 9, 1971. In FIG. 2 of the subject reference it can be seen that a detector 12 is connected to the "M" lead or signaling control input and the detector 12 provides timing for signal enhancement that is applied to the keyer circuit 14. The "M" lead input is also applied to switch "B" and switch "B" under control of the "M" lead turns the 2600 Hz oscillator 10 signal on and off in response to the "M" lead input signaling conditions. In addition to the circuit complexity disclosed it should be noted that there are several d.c. blocking capacitors, for example, C3, C4, C5 and C6, that are included in the keying circuit and are directly in the tone path. Since these capacitors will not normally be identical, they will not completely cancel out all transients and thus some unwanted signals will tend to reach the transmission line.

SUMMARY OF THE INVENTION

The tone keying circuit for the telephone in-band signaling system of the invention converts the signaling control d.c. voltage level into on and off oscillatory bursts for transmission of the dial pulsing signals. Supervisory signaling information is determined by the continued presence or absence of the signaling tone. In the idle or off-hook condition a low level tone is continuously transmitted to indicate that the circuit is idle and is available. When the circuit is seized at the transmitting terminal, the signaling control actuates the tone keying circuit to effectively cut off tone transmission. This provides supervisory information at the receiving terminal to indicate that the circuit is busy. When the initial dial pulse signal is applied to the signaling control, the tone keyer is switched to its enhanced (high-level) mode and a timing circuit is activated. The timing circuit insures that the enhanced mode is maintained for a predetermined time interval which has a duration in the order of 350 – 500 ms. Following seizure the signaling control changes between ground and negative d.c. voltage in response to dial pulse information supplied from the office equipment or telephone station set. These d.c. control signals actuate switching means in the tone keying circuit to switch the enhanced tone on and off in response to the dial pulse signaling information. These tone signals are then transmitted to the voice frequency path for transmission to the receiving terminal.

DETAILED DESCRIPTION

Figure 1:
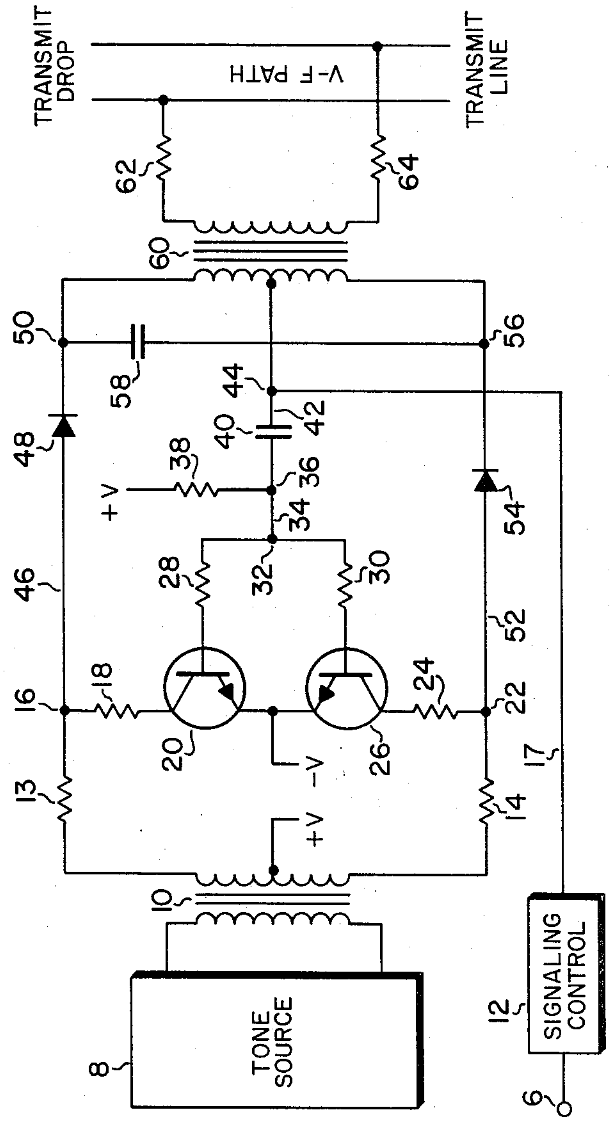
FIG. 1 is a block and schematic diagram of one embodiment of a tone keying circuit according to the invention.

Referring now to FIG. 1 the control signal is normally derived from the office equipment such as, for example, the "M" lead. Alternatively, the control signal may be obtained from the output of a pulse corrector. A pulse corrector that may be used in conjunction with this invention is described in a copending application entitled, "Dial Pulse Correcting Circuit" by Otto G. Wisotzky, Ser. No. 222,175, filed Jan. 31, 1972. However derived, the control signal is applied via input lead 6 to signaling control 12. When the signaling input 6 is connected directly to the "M" lead, control 12 may be an inverter and voltage divider which provides the proper voltage level and polarity to the input of the tone keying circuitry via lead 17 connected to the output of the control 12. If the signaling input is derived from a pulse correction circuit, such as that disclosed in the copending application referenced above, then signaling control 12 may be the dial pulse correcting circuit.

A positive direct current output voltage from control 12 applied via junction 44 and the center tap of the primary of transformer 60 places a positive voltage at the cathodes of diodes 48 and 54 in the tone source path. As hereinbefore explained, the two conditions of the control voltage are most often ground and negative battery. Thus, when a positive direct current (d.c.) voltage is specified, the actual condition may be ground. In the description, positive and negative voltages will be called out since such conditions are usable and are more commonly understood. Also, with a positive d.c. voltage at junction 44 transistors 20 and 26 are turned on because of the bias voltage applied to the base from the +V source via resistors 38, junction 36, path 34, junction 32, and resistors 29 and 30. This places a negative voltage at the anodes of diodes 48 and 54 which voltage is derived from the voltage dividers consisting of resistors 13 and 18 and resistors 14 and 24 at junctions 16 and 22, respectively. Thus, diodes 48 and 54 are reverse or back biased.

Tone source 8 supplies a single frequency tone, which is generally at a frequency of 2600 Hz within the voice frequency band of a telephone channel, at a constant amplitude via the primary of transformer 10 to the tone keying circuit connected to the secondary of transformer 10. With the positive d.c. voltage input from signaling control 12, transistors 20 and 26 are conducting, which shunts the output of the tone source 8. This reduces to a minimum the tone level applied to transformer 60 and, therefore, to the v.f. path. Further, diodes 48 and 54, which are back biased, present a very high impedance in the transmission path of the keying circuit. This effectively blocks the tone from the primary of transformer 60 and, therefore, only a minimum or residual single frequency tone level would appear in the v.f. path. For all practical purposes, this would be an "off" condition for the tone and would be interpreted as a busy condition at the receiving terminal.

It should also be noted that, with the transistors 20 and 26 conducting, the voltage at the junction 36 is less than +V and therefore capacitor 40 is charged with the voltage being positive on that side of the capacitor which is connected to lead 42 and junction 44. The condition described hereinabove is that which would obtain during a seizure of the circuit or when the circuit goes off hook. This condition would also exist at the end of the dialing period so that the signaling tone is essentially removed during the talking period and this not only prevents a disturbance in the talking path during the talking period but is used as supervisory information at the receiving terminal to indicate that the circuit is busy.

During the dialing period the output of signaling control 12 will switch between +V and −V as the dial pulses shift between the "make" and "break" intervals of the signaling pulse. When a negative voltage is applied to control path 17 junction 44, diodes 48 and 50 are forward biased thus allowing the tone to pass. At the same time timing capacitor 40 has this negative potential applied to the positive side which reduces the bias potential applied to the bases of transistors 20 and 26 thus switching these transistors off. The shunt path between junctions 16 and 22 is effectively open circuited by this switching action, thus the level of the tone is substantially increased. This level enhancement is about 12 dB to correspond to present day practice but could be set for other values. The shunt path will remain open until timing capacitor 40 recharges through resistor 38 at which time it will again forward bias the base emitter junctions of transistors 20 and 26. A timing interval which is in the order of 350–500 ms is established by the timing means comprising capacitor 40 and resistor 38.

At the end of the dialing period, when capacitor 40 has recharged through resistor 38, a forward bias voltage will be applied to the base of transistors 26 and 20 through resistors 28 and 30. These resistors are of the same value and cause the transistors to turn on gradually in a symmetrical fashion. This allows for a smooth transition from a high level to a low level and avoids unwanted transients in the keying circuit. Once these transistors are turned fully on, the low level output of the oscillator is reestablished and continues until a signaling control changes the state on the control lead 17.

Figure 3:
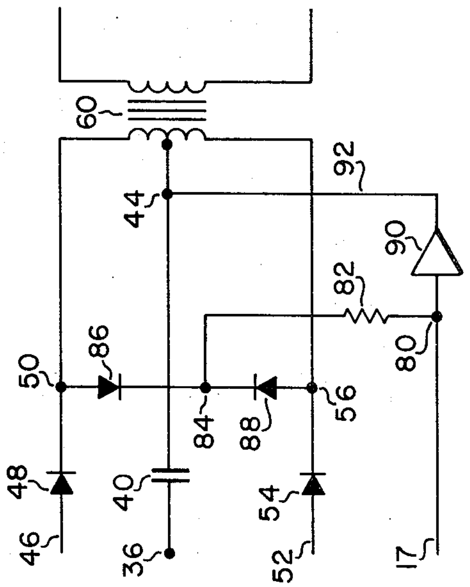
FIG. 3 is a schematic diagram of a modification of the embodiment of FIG. 1 to permit the use of a high inductance transformer in the output circuit.

Resistors 62 and 64 are included in the tone transmission path of the secondary or output transformer 60 to provide a high impedance termination to the voice frequency path and to reduce the bridging loss in that path to a predetermined minimum. Transformer 60 may be either a low inductance transformer or a high inductance transformer. The embodiment of FIG. 1 illustrates a circuit arrangement that could be used when 60 is a low inductance transformer. A modification of FIG. 1 for use with a high inductance transformer is illustrated in FIG. 3. Both embodiments are described below.

For the embodiment of FIG. 1 a capacitor 58 is connected across the tone transmission path and the primary of a low inductance transformer 60 between junctions 50 and 56 and capacitor 58 is selected to resonate with the primary of transformer 60 at the tone frequency. The use of the capacitor to resonate with the primary of transformer 60 avoids the use of a prohibitively large voice frequency transformer which has a high inductance. By resonating the primary by means of capacitor 58 the primary presents a high impedance at the tone frequency and thus prevents unnecessary loading to an external source. Thus the impedance reflected into the primary of transformer 60 is the only loading contributed by the transformer. Resistors 13 and 14 are chosen to match the reflected impedance of transformer 60 in order to provide maximum power transfer to the voice frequency path via the keying circuit and transformer 60. To accomplish this, resistors 13 and 14 are set equal to one-half of the reflected impedance. Resistors 18 and 24 are the tone shunting resistors used to produce the low level tone signal. Resistors 18 and 24 are equal to each other and their values are determined by the values of the voltage divider networks comprising resistors 14 and 24 and resistors 13 and 18 in order to obtain the relative relationship of high to low level tone signals. As hereinbefore noted, the low level tone is the tone signal present during the idle circuit condition and the high level tone represents the enhanced level used during the dialing period.

Figure 2:
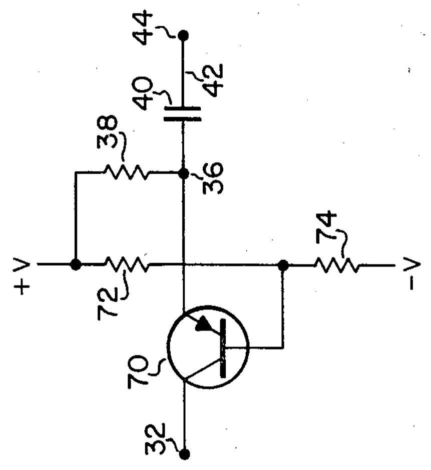
FIG. 2 is a schematic diagram of a modification of the timing and shunt switching circuitry that may be used in the embodiment illustrated in FIG. 1.

It is often desirable to sharpen the transition from the high to the low tone level output and to shorten the reset time for timing capacitor 40. A circuit which will perform these objectives is illustrated in FIG. 2. The circuit is inserted between junctions 32 and 36 in the timing and switching control illustrated in FIG. 1. By using the same designations, where appropriate, it is believed that the position of this circuit arrangement with respect to FIG. 1 is readily apparent. Transistor 70 provides a switching function and resistors 72 and 74 provide the desired base bias to transistor 70 and are selected to turn the transistor on at a predetermined voltage level. These components, added to the keying circuit, as illustrated in FIG. 1, serve as an additional switch and its purpose is to turn on transistors 20 and 26 more rapidly. When transistor 70 turns on, bias potential is immediately applied via the collector of transistor 70 and junction 32 to the bases of transistors 20 and 26, thus minimizing the time required to turn these on. This also reduces the transition time required to shift from high to low tone level. Further, transistor 70 isolates the timing capacitor 40 from the base baising circuitry of transistors 20 and 26 and therefore shortens the reset time required. It has been found that resistor 72 will have approximately the same value as that of resistor 38 and resistor 74 will have a value which is approximately equal to the parallel combination of resistors 28 and 30.

A high inductance transformer also may be used at 60 in FIG. 1. In this case the capacitor 58, connected between junctions 50 and 56 of the primary of the transformer, is not required and would be removed. Further, the modification illustrated in FIG. 2 to sharpen up the transition from high to low level tone may also be used as described above. Where such circuits are used separately no further modifications are necessary. However, the practical application of such keying circuits, which are a part of signaling circuitry used in telephone offices, most often requires that a number of such circuits will be placed in close proximity one to another. The high inductance transformer has an inherent high input impedance and it is well known that such high impedance circuits effectively act as antenna which pick up signals radiated from closely spaced equipment on leads which carry even voice frequency signals. Thus, it is desirable to effectively short circuit the transformer input when there is to be no tone transmitted. Such a shorting arrangement can be provided by further modifying the basic circuit of FIG. 1 by the addition of the new circuit components as shown in FIG. 3. An inverter 90 is connected in path 17 between signaling control 12 and the primary center tap connection of transformer 60. A pair of diodes 86 and 88 are connected across the tone transmission path as shown. The anode of diode 86 is connected to junction 50 and the anode of diode 88 is connected to junction 56. The cathodes of the diodes are connected together to form a junction 84. The signaling control is connected to junction 84 from path 17, junction 80 and limiting resistor 82. Resistor 82 is selected to limit the current through the diodes 86 and 88 when the diodes are forward biased. This forward biasing occurs only when the output of inverter 90 is a positive d.c. voltage. At the same time as hereinbefore explained, diodes 48 and 54 are back biased and the shunting transistors 20 and 26 are turned on. Diodes 86 and 88 effectively short circuit the primary of transformer 60 thus preventing the transmission of spurious signals that may be coupled into the high impedance primary circuit. In addition, the shunting effect of diodes 86 and 88 further reduces the level of leakage tone that would be present from the source 8 but which was not eliminated by the combination of the shunting transistors 20 and 26 and the back biased diodes 48 and 54. Operation of the other portions of the high inductance transformer embodiment is as hereinabove described.

What is claimed is:

1. In a telephone dial pulse signaling system, apparatus for converting first and second d.c. signaling voltage levels into in-band tone signals comprising:
- a tone source;
- a signaling control means responsive to the first and second d.c. signaling voltage levels to provide output signals having, respectively, either a first state or a second state;
- a voice-frequency path;
- tone keying means connected between said tone source and said path, said keying means operative to interrupt said tone source in response to signals having one said state from said control means; and
- shunting means operatively connected to said keying means and responsive to said control means and said other signal state for enhancing said tone source output level for a predetermined time interval.

2. Apparatus in accordance with claim 1 in which said signaling control means further comprises:
- a voltage divider having its input connected to receive said first and second signaling voltage levels; and
- an inverter having its input connected to the output of said voltage divider and having an output connected to the tone keying means whereby a control signal having the required signals having either a first state or a second state is obtained.

3. Apparatus in accordance with claim 1 in which said tone keying means further comprises:
- an input connected to said tone source;
- impedance matching means in the transmission path of said tone keying means;
- gating means connected to said impedance matching means, said gating means passing and interrupting the tone signal applied to said transmission path in response to control signals of said one state; and
- coupling means having an input connected to said transmission path and an output connected to said voice frequency path.

4. Apparatus in accordance with claim 3 in which said coupling means further comprises:
- a voice frequency transformer having a center tapped primary winding and a secondary winding, said primary winding being connected to the output of said gating means and said center tap being connected to said signaling control means;
- a capacitor connected across the primary winding, said capacitor being resonant with the inductance of said transformer at the frequency of the tone source, thereby causing a high impedance at the tone frequency; and
- a pair of equal valued resistors, one in each leg of the secondary of said transformer to connect the secondary to the voice frequency path, said resistors being selected to minimize the bridging loss to said path.

5. Apparatus in accordance with claim 4 in which said gating means comprises a pair of diodes, one in each leg of the tone keyer transmission path.

6. Apparatus in accordance with claim 4 in which said impedance matching means comprises a pair of equal valued resistors, one in each leg of said tone keyer transmission path, each said resistor being selected to be equal to one-half of the reflected impedance of said coupling transformer to obtain maximum power transfer from the tone signal source to the voice transmission path.

7. Apparatus in accordance with claim 1 in which said shunting means further comprises:

timing means having an input connected to said control means and an output;

switching means having an input connected to the output of said timing means and having two outputs, one said output being connected to one leg and the other output being connected to the other leg of the tone keyer transmission path, said switching means being responsive to said timing means and said control means so that said switching means is turned off by said other state of said output signal and is held in this condition by said timing means for said predetermined time interval thereby enhancing the level of the tone signal for the predetermined time interval.

8. Apparatus in accordance with claim 7 in which said timing means further comprises:

a transistor having base, emitter and collector electrodes said collector being operatively connected to the input of said switching means;

a voltage divider consisting of two resistors having one end of each resistor connected together forming a voltage divider junction, the opposite end of one said resistor connected to a voltage of one potential and the opposite end of said other resistor connected to a voltage of a different potential, and having said junction connected to the base of said transistor thereby supplying a base bias voltage;

a timing resistor having one end connected to the positive d.c. potential of said voltage divider; and a capacitor having one lead connected to the output of the signaling control means and the other lead connected to the other end of said timing resistor and to the emitter of said transistor and supplying a bias thereto for controlling conduction of the transistor and thereby the switching means to enhance the tone signal for said predetermined time interval.

9. Apparatus in accordance with claim 7 in which said timing means further comprises:

a timing resistor having one end connected to a positive potential and its other end connected to the input of said switching means; and a timing capacitor having one end connected to said signaling control means and the other end connected to the input of said switching means so that the switching means is responsive to said control means and said timing capacitor.

10. Apparatus in accordance with claim 9 in which said switching means further comprises:

a pair of transistors each having base, emitter and collector electrodes, said emitters being connected together and to a source of negative d.c. potential;

a first shunting resistor having one end connected to one leg of the tone keyer transmission path and the other end connected to the collector of one transistor of the pair;

a second shunting resistor having one end connected to the other leg of the tone keyer transmission path and the other end connected to the collector of the other transistor of said pair;

a first base bias resistor connected at one end to the base of said one transistor of said pair and the other end connected to the input of said switching means; and a second base bias resistor connected at one end to the base of said other transistor of said pair and the other end connected to the input of said switching means.

11. Apparatus in accordance with claim 3 in which said gating means further comprises:

a first pair of diodes positioned in the transmission path of the tone keying means, one in each leg and each poled to be back biased when the control signal is of one said state; and a second pair of diodes positioned in shunt across the transmission path of the tone keying means and each arranged to conduct when the control signal is of one said state.

12. In a telephone dial pulse signaling system, apparatus for converting first and second d.c. signaling voltage levels into tone signals comprising:

a tone source;

a voice-frequency path;

a signaling control means responsive to the first and second d.c. signal voltage levels to provide output signals having, respectively, either a first state or a second state;

a tone keying means, connected between said tone source and said v-f path, comprising: a transmission path having an input and an output, an input coupling means having an input connected to the tone source and an output connected to the input of the transmission path, a switching means connected across said transmission path, said switching means providing a shunt path when said switch is operated; a timing means connected to said switching means and to said control means, said timing means being activated to effectively open said shunt path for a predetermined time interval when the output from the control means first changes from the second state to the first said state, to provide an enhanced tone burst during the dial signaling interval; a gating means in series with said transmission path, said gating means responsive to the output of said control means to turn the enhanced tone signal on and off in response to the first and second output states from said control means; and an output coupling means operatively connecting the output of said transmission path to the voice frequency path.

13. Apparatus in accordance with claim 12 in which said signaling control means further comprises:

a voltage divider having its input connected to receive the first and second d.c. signaling voltage levels; and an inverter having its input connected to the output of said voltage divider and having an output connected to the tone keying means whereby a control signal having the required output states is obtained.

14. Apparatus in accordance with claim 12 in which said output coupling means further comprises:

a voice-frequency transformer having a center tapped primary winding and a secondary winding, said primary winding being connected to the output of said transmission path and said center tap being connected to said signaling control means;

a capacitor connected across the primary winding, said capacitor being resonant with the inductance of said transformer at the frequency of the tone source, thereby causing a high impedance at the tone frequency; and a pair of equal valued resistors, one in each leg of the secondary of said transformer to connect the secondary to the voice-frequency path, said resistors being selected to minimize the bridging loss to said path.

15. Apparatus in accordance with claim 14 in which said transmission path further comprises:

impedance matching means comprising a second pair of equal valued resistors, one in each leg of said transmission path, each said resistor being selected to be equal to one-half of the reflected impedance of the output coupling transformer to obtain maximum power transfer from the tone signal source to the voice-frequency path.

16. Apparatus in accordance with claim 12 in which said timing means further comprises:

a transistor having base, emitter and collector electrodes, said collector being operatively connected to the input of said switching means;

a voltage divider consisting of two resistors having one end of each resistor connected together forming a voltage divider junction, the opposite end of one said resistor connected to a voltage of one potential and the opposite end of said other resistor connected to a voltage of a different potential, and having said junction connected to the base of said transistor, thereby supplying a base bias voltage;

a timing resistor having one end connected to the positive d.c. potential of said voltage divider; and a capacitor having one lead connected to the output of the signaling control means, and the other lead connected to the other end of said timing resistor and to the emitter of said transistor and supplying a bias thereto for controlling conduction of the transistor and thereby the switching means to enhance the tone signal for said predetermined time interval.

17. Apparatus in accordance with claim 16 in which said timing means further comprises:

a timing resistor having one end connected to a positive potential and its other end connected to the input of said switching means; and a timing capacitor having one end connected to said signaling control means and the other end connected to the input of said switching means so that the switching means is responsive to said control means and said timing capacitor.

18. Apparatus in accordance with claim 17 in which said switching means further comprises:

a pair of transistors each having base, emitter and collector electrodes, said emitters being connected together and to a source of negative d.c. potential;

a first shunting resistor having one end connected to one leg of the tone keyer transmission path and the other end connected to the collector of one transistor of the pair;

a second shunting resistor having one end connected to the other leg of the tone keyer transmission path and the other end connected to the collector of the other transistor of said pair;

a first base bias resistor connected at one end to the base of said one transistor of said pair and the other end connected to the input of said switching means; and, a second base bias resistor connected at one end to the base of said other transistor of said pair, and the other end connected to the input of said switching means.

* * * * *